United States Patent [19]

Ariga

[11] Patent Number: 4,913,111
[45] Date of Patent: Apr. 3, 1990

[54] TURBULENCE GENERATOR FOR TWO-STROKER SPARK-ASSISTED DIESEL ENGINES

[75] Inventor: Susumu Ariga, San Antonio, Tex.

[73] Assignee: Sanshin Kogyo Kabushiki Kaisha, Hamamatsu, Japan

[21] Appl. No.: 212,139

[22] Filed: Jun. 27, 1988

Related U.S. Application Data

[60] Continuation of Ser. No. 54,776, May 27, 1987, abandoned, which is a division of Ser. No. 846,905, Apr. 1, 1986, Pat. No. 4,686,941.

[51] Int. Cl.$^4$ ............................................. F02B 19/12
[52] U.S. Cl. .................................... 123/256; 123/260; 123/261; 123/262
[58] Field of Search ................ 123/26, 256, 262, 263, 123/260, 261, 268

[56] References Cited

U.S. PATENT DOCUMENTS

| | | | |
|---|---|---|---|
| 1,941,805 | 1/1934 | Lang | 123/256 |
| 1,944,352 | 1/1934 | Lang | 123/26 |
| 2,004,631 | 6/1935 | Lang | 123/256 |
| 2,262,981 | 11/1941 | Weber | 123/261 |
| 2,534,322 | 12/1950 | Thaheld | 123/256 |
| 2,599,908 | 6/1952 | Gehrandt | 123/268 |
| 2,696,808 | 12/1954 | Chronic et al. | 123/256 |
| 4,124,000 | 11/1978 | Genslak | 123/256 |
| 4,237,827 | 12/1980 | Hamai | 123/262 |

FOREIGN PATENT DOCUMENTS

| | | | |
|---|---|---|---|
| 579556 | 6/1933 | Fed. Rep. of Germany | 123/256 |
| 366114 | 12/1938 | Italy | 123/256 |

OTHER PUBLICATIONS

SAE Technical Paper Series—"Investigation of a Spark-Assisted Diesel Engine", R. G. Phatak, Southwest Research Institute and K. Komiyama, Komiyama, Komatsu, Ltd., Japan.
The Internal Combustion Engine in Theory and Practice, C. F. Taylor, vol. 3, p. 112, MIT Press, 1968, p. 5 of 6.
Internal Combustion Engines, R. S. Benson and N. D. Whitehouse, vol. 1, p. 8, Pergamon Press 1979.

Primary Examiner—Andrew M. Dolinar
Attorney, Agent, or Firm—Ernest A. Beutler

[57] ABSTRACT

A combustion chamber for a spark assisted diesel engine embodying a main combustion chamber and an energy cell. Fuel is injected into the main chamber and into the energy cell and combustion is initiated in the main chamber. The energy cell communicates with the main chamber through a restricted orifice and the increased pressure of the combustion causes auto ignition in the energy cell to generate a high velocity charge out of the energy cell into the main chamber through the orifice for generating turbulence to insure complete combustion.

12 Claims, 1 Drawing Sheet

TURBULENCE GENERATOR FOR TWO-STROKER SPARK-ASSISTED DIESEL ENGINES

This is a continuation of U.S. patent application Ser. No. 54,776, filed May 27, 1987, now abandoned Turbulence Generator for Two-Stroke Spark-Assisted Diesel Engines, which application is a division of Ser. No. 846,905, filed Apr. 1, 1986, and which has issued as U.S. Pat. No. 4,686,941 on Aug. 18, 1987.

BACKGROUND OF THE INVENTION

This invention relates to a turbulence generator for two-stroke spark assisted diesel engines and more particularly to an improved arrangement for ensuring good, complete combustion in an engine of this type.

Because of the high fuel efficiency of a diesel engine, there is considerable interest in widen applications for engines of this type. However, the extremely high compression ratios employed with conventional diesel engines and the attendant weight necessary to compensate for the high stresses created by these high compression ratios has limited the application of diesel engines. For example, there are particular advantages in being able to employ a diesel engine in connection with an outboard motor. However, outboard motors must, of their very nature, be quite light in weight and thus conventional diesel engines have not enjoyed wide popularity in this form of application.

Most outboard motors are operated on the two-cycle principle because of the high output possible with such engines due to the higher frequency of firing than with four-cycle engines. However, the two-cycle engine has a defect in that it normally has a higher specific fuel consumption than a four-cycle engine. Therefore, there are certain advantages to the application of diesel engines for two-cycle outboard motors. Again, however, the high weight associated with conventional diesel engines has limited their use in outboard motors.

It has been proposed to reduce the weight of a diesel engine by employing a lower than normal compression ratio. While most diesel engines operate with compression ratios in the range of 17:1, it is possible to provide diesel operation with compression ratios of 12:1 and under. To insure complete combustion, it is necessary with such lower compression engines to employ a spark plug for assisting ignition in at least some of the running conditions. However, there still remains the problem of insuring complete combustion during the running cycle of such an engine to insure the advantages of good fuel economy as well as high power output.

It is, therefore, a principal object of this invention to provide an improved combustion chamber configuration and method of operating an engine to insure good combustion efficiency and high power output.

It is further object of this invention to provide an improved combustion chamber configuration and method of operating an engine to insure complete combustion on a diesel cycle.

It is a yet further object of this invention to provide an improved combustion chamber for a spark assisted diesel engine.

SUMMARY OF THE INVENTION

This invention is adapted to be embodied in a combustion chamber for an internal combustion engine that comprises a main chamber portion, in energy cell portion of substantially smaller volume than the main chamber portion and a restricted orifice for providing communication between the energy cell and the main chamber portion. Means are provided for delivering a fuel/air charge into the main chamber portion and into the energy cell portion. Means are provided for initiating combustion in the combustion chamber in the main chamber portion for increasing the pressure in the energy cell portion and effecting combustion therein to effect a high velocity flow from the energy cell into the main chamber portion through the orifice to generate turbulence therein at the end of the combustion cycle.

DETAILED DESCRIPTION OF THE PREFERRED EMBODIMENT

Figure 1:
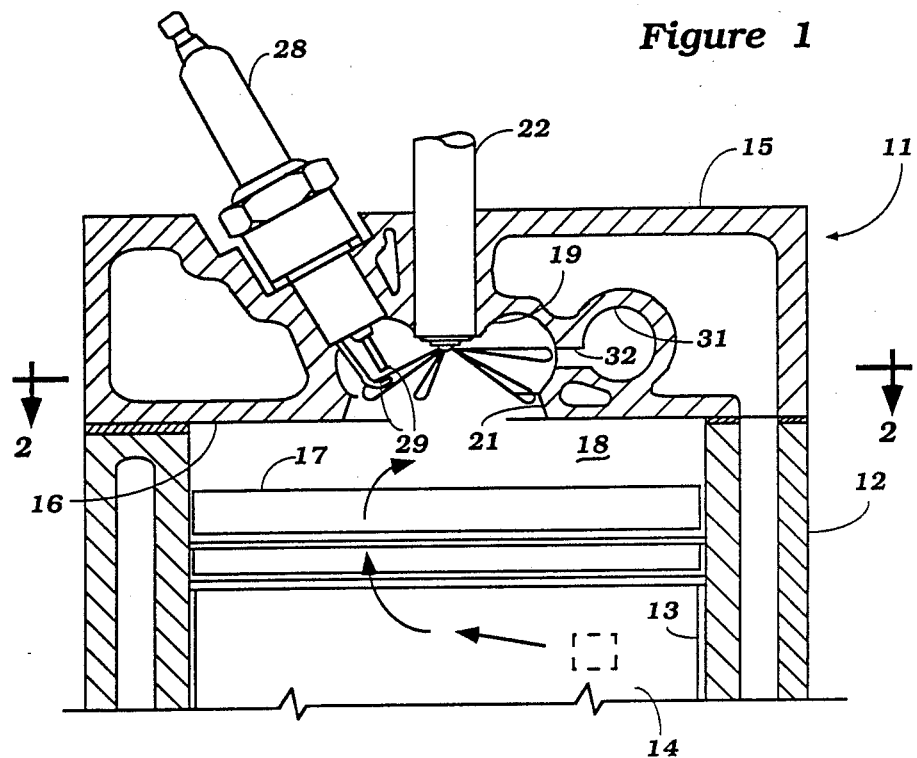
FIG. 1 is a cross-sectional view taken through a portion of the cylinder of a two-cycle, crankcase compression, spark assisted diesel engine constructed in accordance with an embodiment of the invention.

In the drawings, the reference numeral 11 indicates generally a two-cycle, crankcase compression, spark assisted diesel engine constructed in accordance with an embodiment of the invention. Inasmuch as the invention relates to the combustion chamber for the engine 11, only that portion has been illustrated and will be described. Also, the construction associated with only a single cylinder is illustrated and will be described even though it will be readily apparent to those skilled in the art that the invention is susceptible of use with multiple cylinder engines.

The engine 11 includes a cylinder block 12 in which a cylinder bore 13 is formed. A piston 14 is slidably supported within the cylinder bore 13 and is connected by means of a connecting rod (not shown) to a crankshaft for driving it in a known manner. In addition, the piston 13 cooperates with transfer, intake and exhaust ports formed in the walls of the cylinder bore 13 for admitting an air charge into the crankcase, for permitting its transfer from the crankcase to the combustion chamber, to be described, and for exhausting the burnt charge. Except as hereinafter noted, the construction and arrangement of these ports may be considered to be conventional and, for that reason, they have not been illustrated.

A cylinder-head 15 is affixed to the cylinder block 12 in a known manner. The cylinder head 15 has a generally planar lower face 16 that cooperates with a generally planar head 17 of the piston to form a portion of the combustion chamber. As is known, the minimum volume of the combustion chamber is defined when the piston 14 is at its top dead center position, which is slightly above the position shown in FIG. 1. The portion of the combustion chamber defined by the piston head 17 and cylinder head surface 16 is identified generally by the reference numeral 18 and forms a portion of the main combustion chamber.

The cylinder head 15 is provided with a generally toroidal shaped recess 19 which may be formed from a cylinder of revolution. This recess communicates with the area 18 through a generally tapered mouth 21. The total volume of the chamber 19, mouth 21 and chamber 18 form the major portion of the clearance volume of the engine.

Figure 2:
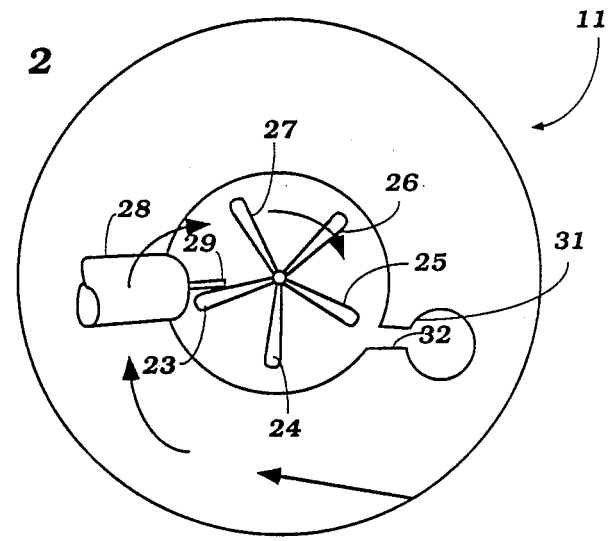
FIG. 2 is a cross-sectional view taken along the line 2—2 of FIG. 1.

A fuel injection nozzle 22 is supported within the cylinder head 15 generally at the center of the cylinder head chamber portion 19. As seen in FIG. 2, the injection nozzle has a spray pattern made up of a series of discharge passages 23, 24, 25, 26 and 27 and these define a generally conical spray pattern. It is to be understood that other spray patterns may be employed, however.

A spark plug 28 is affixed within the cylinder head 15 and has extending terminals 29 that are disposed within the combustion chamber portion 19 and specifically at an area where they will be intersected by the spray from one of the injection nozzle openings, in this embodiment the nozzle opening that provides the spray 23. In this way, it will be insured that there is a stoichiometric fuel/air charge present at the spark plug gap 29 when the plug fires. This will insure good combustion.

Although the engine 11 operates on the diesel cycle, it has been found desirable, due to the use of a lower than normal compression ratio, to employ the spark plug 28 for initiating combustion under at least some running conditions. If desired, the spark plug 28 may be fired under all running conditions. Although this has been found to provide good combustion, there are indications that the described arrangement does not provide the necessary power output or as good a fuel consumption as would be possible. This is due to the relatively low turbulence which exists in the combustion chamber made up of the portions 18, 19 and 21. Therefore, a device, now to be described, is provided for increasing the turbulence in the combustion chamber and insuring complete fuel consumption and good power output.

In accordance with the invention, an energy cell, indicated generally by the reference numeral 31 and having a generally spherical configuration is formed in the cylinder head 15 to one side of the combustion chamber portion 19. Although a spherical configuration is illustrated for the energy cell 31, it may have other configurations such as cylindrical or the like. The energy cell 31 communicates with the main chamber portion 19 through an orifice 32 which is offset from the center of about which the shape 19 is generated. The orifice 32 and energy cell 31 have a relatively small volume is relation to the volume of the chamber 19 and of the complete combustion chamber. The orifice 32 is, however, positioned so that one of the injection nozzle openings, for example that issuing the spray 25, will be directed toward it so that fuel will enter the energy cell 31 through the orifice 32 when the injector 22 discharges. Preferably, the port issuing this spray is larger in diameter or effective cross-sectional area than the remaining injector ports.

The arrangement works as follows. When the compressed air charge is transferred to the combustion chamber and the piston 14 approaches its top dead center position, the injection nozzle 22 discharges a spray. A portion of this spray (25) will enter the energy cell 31 through the orifice 32. At an appropriate time the spark plug 28 will be fired and, at this time, there will be a stoichiometric fuel/air mixture present at the gap 29 as delivered by the spray 23. Hence, combustion will be initiated in this area and will propagate across the main chamber 19 at a fairly high rate.

As the pressure in the chamber 19 rises due to the combustion occurring therein, this pressure rise will be transmitted through the orifice 32 to the energy cell 31. When the pressure rises sufficiently, the fuel/air charge in the energy cell 31 will auto ignite and the pressure in the energy cell will rise rapidly to a point that is higher than the pressure in the main chamber portion 19. There will then be issued from the orifice 32 at a high velocity a blast of hot fuel and air gases which will introduce additional turbulence in the combustion chamber portion 19 to promote mixing and insure complete combustion.

Because of the offset relationship of the orifice 32, the charge which issues from the orifice 32 under the aforenoted condition will introduce a swirl in the chamber 19. This swirl may be augmented by a swirl generated by the appropriate formation of the scavenge ports or, alternatively, may act in opposition to swirl generated by the configuration of the scavenge ports as shown by the arrows in FIGS. 1 and 2. Alternatively, no additional swirl may be introduced in the intake charge that is transferred to the combustion chamber to the scavenge port.

As illustrated, the orifice 32 extends in a generally parallel plane to the head 17 of the piston. If desired, the orifice 32 may be canted slightly downwardly so that it will also introduce swirl into the combustion chamber portion 18. Various other changes and modifications in the orientation are permissible within the inventive concept disclosed herein and such changes will be obvious to those skilled in the art, without departing from the spirit and scope of the invention, as defined by the appended claims.

I claim:

1. A combustion chamber for an internal combustion engine comprising a main chamber portion, an energy cell portion of substantially smaller volume than said main chamber portion and communicating with said main chamber portion through a restricted orifice, a single fuel injection nozzle delivering a fuel charge into said main chamber portion in a direction away from said energy cell and another fuel charge directed toward and into said energy cell portion, and means for initiating combustion in said combustion chamber in said main chamber portion prior to combustion said energy cell for increasing the pressure in said energy cell portion prior to combustion therein for subsequently effecting combustion therein to effect a high velocity flow from said energy cell into said main chamber portion during the expansion stroke through said orifice to generate turbulence therein after combustion in the main chamber portion has begun.

2. A combustion chamber as set forth in claim 1 wherein the combustion is initiated and at least initially maintained by a diesel cycle.

3. A combustion chamber as set forth in claim 2 wherein the fuel injection nozzle has a plurality of ports discharging into the main chamber portion and a lesser number of ports discharging into the energy cell portion through the orifice.

4. A combustion chamber as set forth in claim 1 wherein the main chamber portion is defined in part by a surface of revolution, the orifice being offset from the generating axis of said surface.

5. A combustion chamber as set forth in claim 3 wherein the fuel injection nozzle has only one of the ports being directed toward the orifice for delivering fuel to the energy cell.

6. A combustion chamber as set forth in claim 5 wherein the fuel injection nozzle has a plurality of orifices discharging in different directions.

7. A combustion chamber as set forth in claim 3 further including means for generating a swirl in the combustion chamber.

8. A combustion chamber as set forth in claim 7 wherein the means for generating the swirl comprises an intake passage for generating a swirl to the intake charge.

9. A combustion chamber as set forth in claim wherein the swirl is disposed about a vertically extending axis.

10. A combustion chamber as set forth in claim 7 wherein the swirl has an axial component.

11. A combustion chamber as set forth in claim 5 further including a spark plug for initiating combustion within the combustion chamber.

12. A combination chamber as set forth in claim 11 wherein the spark plug has its gap positioned within the surface of revolution.

* * * * *

UNITED STATES PATENT AND TRADEMARK OFFICE
CERTIFICATE OF CORRECTION

PATENT NO. : 4,913,111
DATED : April 3, 1990
INVENTOR(S) : Susumu Ariga

It is certified that error appears in the above-identified patent and that said Letters Patent is hereby corrected as shown below:

On the Title Page, In the Title, "TWO-STROKER" should be --TWO-STROKE--.
Column 1, line 2, "TWO-STROKER" should be --TWO-STROKE--.
Column 4, line 39, Claim 1, after "combustion" insert --in--.
Column 5, line 5, Claim 9, after "claim" insert --7--.
Column 6, line 6, Claim 12, "combination" should be --combustion--.

Signed and Sealed this

Twenty-fourth Day of November, 1992

Attest:

DOUGLAS B. COMER

Attesting Officer

Acting Commissioner of Patents and Trademarks